United States Patent Office 3,500,124
Patented Mar. 10, 1970

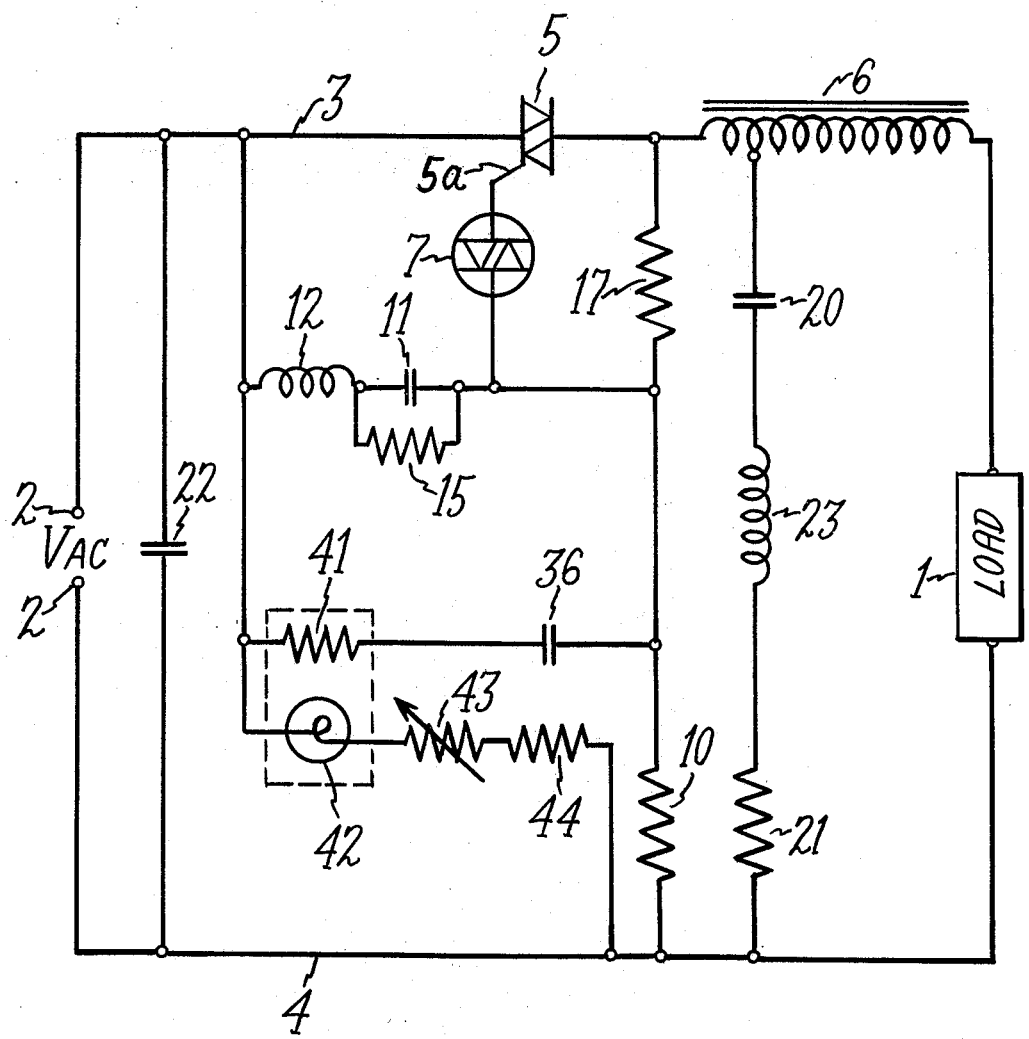

3,500,124
DISCHARGE LAMP CONTROL CIRCUIT WITH SEMICONDUCTOR ACTUATING MEANS THEREFOR
Robert E. Babcock, Hendersonville, N.C., assignor to General Electric Company, a corporation of New York
Filed June 19, 1967, Ser. No. 646,871
Int. Cl. H05b 37/02, 39/04, 41/00
U.S. Cl. 315—200                      3 Claims

ABSTRACT OF THE DISCLOSURE

Control circuit for starting and operating gas discharge lamps from a source of alternating current includes a bi-directional semiconductor controlled switch having a single control electrode and connected between the alternating current source and the lamp, and an actuating circuit connected to the alternating current source and to the control electrode for applying a control signal to the control electrode at a predetermined time in each alternating current cycle, the actuating circuit including a capacitor and resistor connected in series and a solid state bilateral voltage sensitive switch connected to the capacitor and the control electrode in series discharge relation therewith for triggering the controlled switch into conduction in opposite direction on alternate half cycles.

---

It is a object of the invention to provide an improved control circuit of the above type which is low in cost, simple in construction, and reliable in operation.

It is a particular object of the invention to provide a simplified triggering and switching arrangement for control of lamps and other loads which incorporates an alternating current symmetrical switch device with a single control electrode.

It is another object of the invention to provide a control circuit of the above type having high voltage generating means for starting load devices, such as gas discharge lamps, requiring high voltage for starting.

Other objects and advantages will become apparent from the following description and the appended claims.

With the above objects in view, the present invention relates to a control circuit comprising, in combination, a source of alternating current, load means energized by the alternating current source, bidirectional semiconductor controlled switch means connected between the alternating current source and the load means and being normally non-conductive to block current flow to the load means, the controlled switch means having a single control electrode to render it conductive in either direction, actuating means connected to the alternating current source and to the control electrode for applying a control signal to the control electrode at a predetermined time in each alternating current cycle, the actuating means including a capacitance and a resistance connected together in series and a solid state bilateral voltage sensitive switch connected to the capacitance and the control electrode in series discharge relation therewith for triggering the controlled switch into conduction in opposite directions on alternate half cycles.

In a preferred embodiment of the invention, a high voltage generating circuit is connected between the controlled switch and the load, this circuit including a step-up transformer and a charging capacitor connected to the alternating current source and forming with the controlled switch a pulse-producing discharge loop actuated by the firing of the controlled switch.

The invention will be better understood from the following description taken in conjunction with the accompanying drawing, in which:

The single figure is a circuit diagram of a preferred embodiment of a control circuit in accordance with the present invention.

Referring now to the drawing, there is shown a phase-controlled switching circuit for controlling the current and voltage applied to a load 1, which may be a gas discharge lamp such as a sodium vapor, mercury vapor, multi-vapor or other type of lamp, or may be of other forms of variable impedance loads, the load 1 being connected to terminals 2 of a source of alternating current, typically of 120 or 240 volts, by conductors 3 and 4. Arranged in series with lamp 1 is a triac 5, which may be described as an alternating current semiconductor controlled switch having a single control electrode 5a which, when gated, causes the switch to conduct current in the direction as indicated by the forward bias condition of the semiconductor. A triac may also be described as a bi-directional triode for gate control of alternating current power.

The signal generating or actuating circuit comprises series-connected resistance 10 and charging capacitor 11 connected across terminals 2, thereby synchronizing the signal generating function with the source voltage.

In accordance with the invention, the actuating circuit further comprises a solid state symmetrical (i.e., bilaterally conducting) voltage sensitive switch 7 which in the embodiment shown is connected at one side to control electrode 5a and at the other side to the junction of charging capacitor 11 and resistor 10. Switch 7 may also be described as a diac trigger, and more specifically as a diffused silicon bi-directional trigger diode. This device becomes conductive only upon application of a predetermined voltage thereon and is roughly equivalent to a neon glow lamp, but differs therefrom in being a solid state device, and further, breaks down and operates at lower voltages than the neon glow lamp. Diac 7, accordingly, is more compatible with the triggering requirements of triac 5. As shown, diac 7 is effectively connected in series discharge relation with capacitor 11 and control electrode 5a and serves therewith to provide a discharge loop when the voltage on capacitor 11 reaches the breakdown level of diac 7. Thus, when a control signal is applied to electrode 5a by the actuating circuit on each half cycle, triac 5 is gated through its control electrode 5a so as to conduct in opposite directions on alternate half cycles. The control of the delay or advance in the time of the alternating current input cycle at which the control signal impulse is applied to render the triac conductive, thereby dictating the load power level, is known as phase controlling. Phase control actuating means of similar function are disclosed in Patent 3,249,807 and co-pending application Ser. No. 520,487 filed Jan. 13, 1966, both in the name of J. A. Nuckolls and assigned to the same assignee as the present invention, this invention being an improvement on the circuits disclosed in those applications.

In the illustrated embodiment, the switch actuating circuit also comprises resistance 17 connected between the load side of triac 5 and the junction of capacitor 11 and resistance 10. Typically resistance 17 is lower in value than that of resistance 10. In this arrangement, as more fully explained below, resistance 17 serves both as a component of the actuating circuit which includes capacitor 11 and resistance 10, and as a feedback component for stabilizing the load current.

The control circuit further comprises a step-up transformer 6 connected in series between triac 5 and lamp 1, which serves, as more fully explained below, as a combined lamp ballast and high voltage transformer. It thereby combines in a single unit the functions of a reactor ballast and high voltage pulse transformer. Transformer 6 is typically an autotransformer, as shown, with a primary to secondary turns ratio of about 1 to 10.

Connected across lamp 1 is charging capacitor 20 which is connected at one terminal to the transformer tap and at its other terminal to line conductor 4 via resistance 21 and inductor 23. Capacitor 20 thus provides a charge path for drawing energizing current through the primary of transformer 6 when triac 5 is fired.

In the above described circuit arrangement, the trigger pulse timing and generating circuit comprises capacitor 11 in series with an effective resistance consisting of resistance 17 and resistance 10. This effective resistance operates by resistance 17 being placed in parallel with resistance 10 prior to firing of triac switch 5 and in parallel with the capacitor 11 branch for the remainder of the current conducting half cycle. This effective charging resistance and switching arrangement provides for rapid charging of capacitor 11 to enable triac switch 5 to be potentially fired early during the half cycle. However, after triac firing, this arrangement provides a shunting path for capacitor 11 thereby limiting the follow-through 60 cycle current that flows through diac 7.

On any given half cycle in the operation of the described circuit, capacitor 11 charges through resistance 10 and resistance 17 in parallel to a voltage which reaches the breakdown potential, typically 32 volts, of diac 7 which then becomes conductive. Capacitor 11 then discharges through diac 7 and a signal pulse is applied to control electrodes 5a. When triac switch 5 becomes conductive, the operation of the discharge loop comprises triac switch 5, capacitor 20 and the primary of transformer 6 produces high frequency pulses having a voltage which is approximately that of the instantaneous line voltage, these pulses being placed on transformer 6 which then steps up the voltage to a high level, e.g., about 3.5 kilovolts, for starting lamp 1. Once lamp 1 has ignited, the high voltage generating circuit becomes partially de-energized by action of the lamp load impedance becoming low enough to load or dampen the above described high voltage switching mechanism.

Since the combination of lamp 1 and transformer 6 constitutes an inductive load, source current continues to flow after the source voltage reaches zero, and since the trigger actuating circuit is slaved basically to the source voltage, it cannot sense that the collapsing field of the inductor forces continued current flow and, in the absence of resistance 17, would proceed to generate a trigger pulse at an undesirable time, e.g., while load current is still flowing from the last half cycle. However, by the provision of feedback resistance 17, the effective trigger circuit charging resistance is influenced or altered by the instantaneous load conditions. Thus, resistance 17 provides for stable lamp load starting and correct wattage buildup even though the lamp impedance changes radically during this period, as more fully explained in the above mentioned co-pending application.

The circuit also includes a device for compensating for input voltage variations which comprises photo-conductor 41, such as a cadmium sulfide photocell, connected across capacitor 11, and a small incandescent lamp 42 with series resistances 43 and 44 connected across supply lines 3 and 4, incandescent lamp 42 being arranged so that its light is incident on photo-conductor 41. In the operation of this system, if the line voltage increases, the current through incandescent lamp 42 increases, brightening lamp 42 and causing photo-conductor 41 to decrease in resistance and thereby shunt more of the available charging current away from capacitor 11. This slows the voltage buildup across capacitor 11, thus delaying the firing of triac 5 and regulating the power delivered to lamp 1. A decrease in line voltage operates conversely to advance the firing of triac 5 to prevent a decrease in power supply to lamp 1. Resistance 43, as shown, may be a variable resistor for setting the nominal power level in the lamp 1. Resistance 44 provides a fixed resistance for limiting the dissipation in the variable resistance 43.

Capacitor 36 in series with photoconductor 41 functions to vary the effective charging time of capacitor 11.

Further features provided in the circuit in accordance with the invention comprise an air core inductor 12 arranged in series with charging capacitor 11 in the actuating circuit, and a similar air core inductor 23 arranged in series with charging capacitor 20 in the high voltage generating circuit. Inductor 12 serves to shape the gate pulse current applied to triac 5 to make it compatible with the operational characteristics of the triac. For optimum operation, the triac requires a trigger pulse of certain minimum amplitude and width, and inductor 12 provides such characteristics so as to ensure proper operation of the triac and enhance its life characteristics.

Inductor 23 serves to limit the rate of rise of the initial charging current through the high voltage generating circuit for the purpose of protecting triac 5, which otherwise might be damaged by an excess rate of current rise. Other types of impedance means having an equivalent function may be substituted for the air core inductors 12 and 23.

Resistance 21 in series with capacitor 20 and inductor 23 serves to limit the magnitude of the initial charging current for further protection of triac 5.

To provide stabilization of the triggering action despite a possible lag of response of photocell 41, resistance 15 is preferably arranged in parallel with charging capacitor 11 in the actuating circuit.

Power factor improvement is provided in the circuit by capacitor 22 connected across the source terminals as shown.

In a typical circuit in accordance with the invention, the following components shown in the drawing have the indicated values:

Capacitors:
```
11 _____microfarads__ 0.033
20 _____do____ 0.22
36 _____do____ 0.23
22 _____do____ 40
```

Resistors:
```
15 _____ohms__ 100K
44 _____do____ 8K
43 _____do____ 3K
17 _____do____ 180K
10 _____do____ 220K
21 _____do____ 50
41 _____      (¹)
```

Inductors:
```
6  _____ohms__ 40
12 _____microhenries__ 70
23 _____do____ 70
```
¹ Dependent on light level.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A control circuit comprising, in combination, a source of alternating current, load means energized by said alternating current source, bi-directional semi-conductor controlled switch means connected between said alternating current source and said load means and being normally non-conductive to block current flow to said load means, said controlled switch means having a single control electrode to render it conductive in either direction, actuating means connected to said alternating current source and to said control electrode for applying a control signal to said control electrode at a predetermined time in each alternating current cycle, said actuating means including a capacitance and a resistance connected together in series, and a solid state bi-lateral voltage sensitive switch and a first inductor connected to said capacitance and said control electrode and forming a series discharge loop therewith for triggering said controlled switch means into conduction in opposite directions on alternate half cycles.

2. A control circuit as defined in claim 1, said controlled switch means comprising a solid state bi-directional triode, and said voltage sensitive switch comprising a bi-directional trigger diode.

3. A control circuit as defined in claim 2, and high voltage generating pulse means for providing a high voltage starting pulse on said load means comprising transformer means having primary and secondary windings connected between said triode and said load means, charging capacitance means connected to the primary winding of said transformer means and across said load means for providing a charge path for energizing current through the primary of said transformer means when said triode is fired, and impedance means including a second inductor connected in series with said charging capacitance means for limiting the rate of rise of said energizing current to a limit compatible with said triode.

References Cited

UNITED STATES PATENTS

| | | | |
|---|---|---|---|
| 3,344,310 | 9/1967 | Nuckolls | 315—199 |
| 3,344,311 | 9/1967 | Nuckolls | 315—199 |
| 3,317,789 | 5/1967 | Nuckolls | 315—194 |
| 3,249,807 | 5/1966 | Nuckolls | 315—199 |
| 3,328,673 | 6/1967 | Nuckolls | 323—21 |

JOHN W. HUCKERT, Primary Examiner

B. ESTRIN, Assistant Examiner

U.S. Cl. X.R.

307—305; 315—194, 199, 241